J. C. NOBLES.
Improvement in Culinary Utensils for Broiling or Frying.
No. 120,769. Patented Nov. 7, 1871.
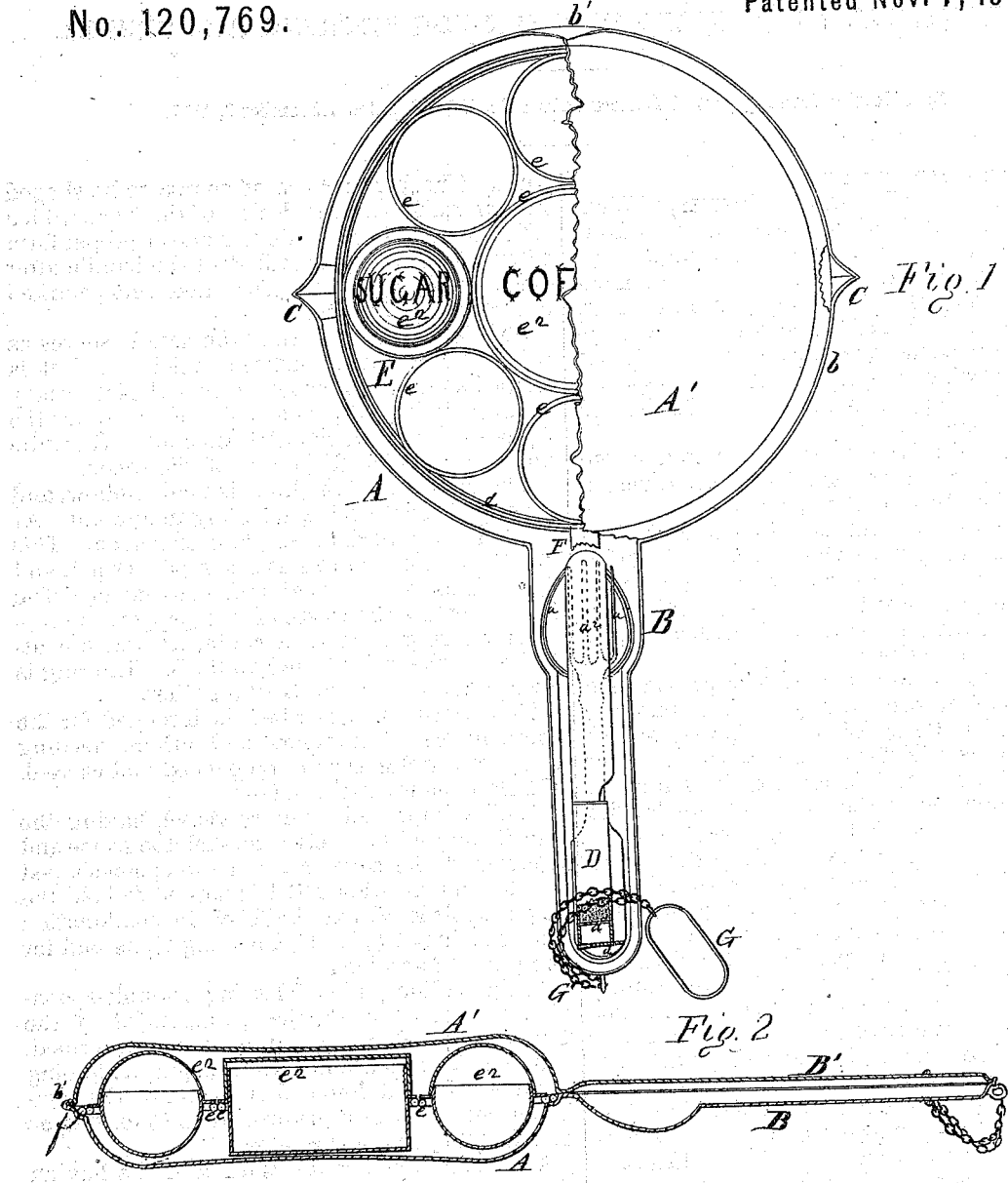

UNITED STATES PATENT OFFICE.

JOHN C. NOBLES, OF ILION, NEW YORK.

IMPROVEMENT IN CULINARY UTENSILS FOR BROILING AND FRYING.

Specification forming part of Letters Patent No. 120,769, dated November 7, 1871.

*To all whom it may concern:*

Be it known that I, JOHN C. NOBLES, of Ilion, in the county of Herkimer and State of New York, have invented a new and valuable Improvement in Culinary Utensils; and I do hereby declare that the following is a full, clear, and exact description of the construction and operation of the same, reference being had to the annexed drawing making a part of this specification, and to the letters and figures of reference marked thereon.

Figure 1 of the drawing is a top view and central section of my invention. Fig. 2 is a vertical longitudinal section of the same.

This invention has relation to culinary utensils; and it consists in the novel construction of a frying-pan in connection with a number of other articles which it is adapted to hold when not applied to the purpose of frying, all arranged as hereinafter described.

Referring to the drawing, A A' represent the body and cover, respectively, of a frying-pan, having the handle B B' in two parts, one of which serves as a lid for the other part. Around the edge of the pan A is an upright flange, $b$, which extends along the edges of the handle part B and serves to hold the covers A and B'. Diametrically opposite the handle B the flange is bent over so as to form a catch, $b'$, to hold the pan and its cover together. At the points C C spouts are made, by means of which the juices from the meat, when the pan is used to fry, may be poured off. E represents a skeleton frame, made of stout wire or cast in the proper form. Its design is a number of small circles, $e$, encircled by a large ring, $e^1$, to which is attached a handle, F, and which rests on the ledge $f$ bent in the frying-pan A. This frame is designed to hold a number of cylindrical, spherical, or otherwise-shaped boxes, $e^2$, having suitable lids, and provided with horizontally-projecting flanges to rest on the circles $e$. These boxes are used to contain different articles necessary in cooking, seasoning, &c., as sugar, salt, pepper, coffee, tea, &c. By removing the boxes and taking out the frame E it may be used as a gridiron for broiling meats. The frying-pan and frame E may be either of a circular or other suitable form. The boxes $e^2$ are of course to be shaped in conformity with the design of the frame which holds them. The handle is made of proper form to fit between the parts B B' of the handle after the insertion of a spoon, fork, and knife, marked $a$ $a^1$ $a^2$ in the drawing.

It will be observed that the handle serves as a box for the above-named articles, and it is shaped similar to a spoon, so that the latter may fit nicely in its place, the basin being toward the frying-pan and the mouth turned up. The knife and fork are placed on top of the spoon.

The handle D of the knife is made hollow, and is furnished with a lid, $d$, sliding in and out. At $d'$ is placed a perforated plate or screen. This handle is designed to serve as a pepper-pot, and for such purpose is neat and convenient. The lid $d$ prevents the waste of the pepper. G represents a ring hung to a chain, G', which is attached to the end of the handle B. The ring is used to hold the parts B B' together.

The utensil, as described, is intended for the convenience of travelers and others needing compact articles easy to be packed and carried.

I claim as my invention—

1. The improved culinary vessel, having the pan A adapted to receive the skeleton frame and gridiron E, the cover A', and the spoon-shaped handle and handle-lid B B' adapted to hold the spoon $a$, fork $a^1$, and knife $a^2$, in combination with the flange $b$, lip $b'$, and ring G, as and for the purpose specified.

2. In a culinary utensil having a double-spoon-shaped handle, B B', the arrangement of the knife, fork, and spoon, in the manner described.

3. The combination with the pan A, having the cover A' and double handle B', of the combined box-frame and gridiron E and boxes $e^2$, as and for the purpose specified.

4. The improved travelers' dinner-knife, having the hollow handle D with lid $d$, as and for the purpose set forth.

In testimony that I claim the above I have hereunto subscribed my name in the presence of two witnesses.

JOHN C. NOBLES.

Witnesses:
D. B. KANE,
JNO. M. HYNE.